(12) United States Patent
Schwab et al.

(10) Patent No.: US 11,299,039 B2
(45) Date of Patent: Apr. 12, 2022

(54) TANK FLAP OR CHARGING FLAP ARRANGEMENT

(71) Applicant: ILLINOIS TOOL WORKS INC., Glenview, IL (US)

(72) Inventors: Andreas Schwab, Holzkirchen (DE); Thomas Lechner-Watzlik, Wurzburg (DE); Julian Fischer, Kleinrinderfeld (DE); Andreas Stubenberger, Unterschleißheim (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 225 days.

(21) Appl. No.: 16/596,281

(22) Filed: Oct. 8, 2019

(65) Prior Publication Data
US 2020/0114756 A1 Apr. 16, 2020

(30) Foreign Application Priority Data
Oct. 11, 2018 (DE) .......................... 102018125209.9

(51) Int. Cl.
*B60K 15/05* (2006.01)
*B60K 15/03* (2006.01)

(52) U.S. Cl.
CPC .... *B60K 15/05* (2013.01); *B60K 2015/03269* (2013.01); *B60K 2015/053* (2013.01)

(58) Field of Classification Search
CPC ...... B60K 2015/0515; B60K 2015/053; B60K 2015/0553
See application file for complete search history.

(56) References Cited

U.S. PATENT DOCUMENTS

| 5,165,749 | A | * | 11/1992 | Sheppard | B60K 15/05 220/86.2 |
| 5,836,638 | A | * | 11/1998 | Slocum | B60K 15/05 296/97.22 |
| 5,924,757 | A | * | 7/1999 | Stapf | B60K 15/05 296/97.22 |
| 9,227,509 | B1 | * | 1/2016 | Jones | B60K 15/05 |
| 2007/0040409 | A1 | * | 2/2007 | Alfaro | B60K 15/05 296/97.22 |
| 2014/0060920 | A1 | * | 3/2014 | Tamaoki | B60J 5/00 174/541 |
| 2016/0280061 | A1 | * | 9/2016 | Desai | B60K 15/04 |
| 2017/0267096 | A1 | * | 9/2017 | Hagano | B60K 15/0406 |
| 2018/0215254 | A1 | * | 8/2018 | Jobst | H01R 13/6397 |
| 2018/0236870 | A1 | * | 8/2018 | Watanabe | B60K 15/05 |
| 2019/0135106 | A1 | * | 5/2019 | Sasaki | B60K 15/05 |
| 2019/0184818 | A1 | * | 6/2019 | Takashi | B60K 15/05 |

(Continued)

FOREIGN PATENT DOCUMENTS

JP 2019130956 A * 8/2019 ............ B60K 15/05

*Primary Examiner* — Jeffrey J Restifo
(74) *Attorney, Agent, or Firm* — Thompson Hine LLP (57) ABSTRACT

A tank flap or charging flap arrangement, for a vehicle, includes a housing body and a tank flap or charging flap which is mounted on the housing body via a hinge arm so as to be pivotable between a closed position and an open position. In the closed position, the hinge arm is received in a receiving space of the housing body and, in the open position, protrudes at least partially out of the receiving space. A cover is arranged on the housing body or the hinge arm and covers the receiving space when the tank or charging flap is in the open position.

16 Claims, 6 Drawing Sheets

(56) References Cited

U.S. PATENT DOCUMENTS

| | | | |
|---|---|---|---|
| 2019/0232782 A1* | 8/2019 | Takeuchi | B60K 15/05 |
| 2020/0055389 A1* | 2/2020 | Herzig | E05D 3/125 |
| 2020/0114756 A1* | 4/2020 | Schwab | B60K 15/05 |
| 2020/0130505 A1* | 4/2020 | Yagura | B60K 15/05 |
| 2020/0198463 A1* | 6/2020 | Yagura | B60K 15/05 |
| 2020/0207203 A1* | 7/2020 | Werner | B60K 15/05 |
| 2020/0298697 A1* | 9/2020 | Lee | B60K 15/0406 |
| 2021/0164272 A1* | 6/2021 | Watanabe | B60K 1/04 |

\* cited by examiner

TANK FLAP OR CHARGING FLAP ARRANGEMENT

TECHNICAL FIELD

The invention concerns a tank flap or charging flap arrangement for a vehicle, comprising a housing body and a tank flap or charging flap which is mounted on the housing body via a hinge arm so as to be pivotable between a closed position and an open position, wherein, in the closed position, the hinge arm is received in a receiving space of the housing body and, in the open position, protrudes at least partially out of the receiving space.

BACKGROUND

Tank or charging flap arrangements of the above-mentioned type serve in particular for closing and opening refueling or charging openings of vehicles, in particular cars. Such tank or charging flap arrangements are usually mounted in pivotable fashion on a housing body inserted in a bodywork opening of the car. The housing body comprises a passage opening leading to the tank or battery unit, through which a filler nozzle or charging plug can be passed when the tank or charging flap is in the open position. In the closed position, this passage opening, in particular the entire housing body, is closed by the tank or charging flap. The tank or charging flap thus closes the housing body in particular in a sealed fashion so that no fluids can penetrate into the housing body from the outside.

In known tank or charging flap arrangements, a receiving space is formed inside the housing body for a hinge arm holding the tank or charging flap. Via the hinge arm, the flap can be pivoted between the closed position and the open position, wherein in the closed position, the hinge arm is stowed in the receiving space. For example, this may be a hinge arm in the form of a swan neck. In the open position, at least a large part of the hinge arm protrudes from the receiving space and out of the housing body, for example at a 90° angle. In known tank or charging flap arrangements, the receiving space is exposed when the flap is in the open position. Thus when the tank or charging flap is in the open position, foreign bodies, for example snow, can enter the housing body and in particular reach the receiving space for the hinge arm. The receiving space for the hinge arm has poor accessibility and it is therefore difficult to remove any penetrating snow. This problem occurs in particular with charging flaps for electric vehicles, since because of the charging process, the charging flap is often in the open position for a lengthy period, for example overnight.

SUMMARY

Starting from the prior art outlined above, the invention is based on the object of providing a tank or charging flap arrangement of the type described initially which, in a structurally simple fashion, allows reliable operation of the tank or charging flap at all times.

For a tank or charging flap arrangement of the type described above, the invention achieves the aim with a cover which is arranged on the housing body or on the hinge arm and covers the receiving space when the tank flap or charging flap is in the open position.

The tank or charging flap arrangement according to the invention serves for fueling or electrical charging of a vehicle, in particular a car with an internal combustion engine and/or electric drive. It may serve for filling with an arbitrary operating medium, for example fuel or a urea solution (AdBlue). The hinge arm and also the housing body may consist of a plastic. The same applies to a carrier plate which may support the tank or charging flap. The tank or charging flap itself may be made of a plastic or a metallic material.

As already stated, the housing body may have a tank or charging opening through which a filler nozzle or charging cable can be connected to a tank or battery of the vehicle. In the closed position, the tank or charging flap in particular closes the entire housing body, and hence also the tank or charging opening, and in particular the receiving space arranged inside the housing body. The receiving space may for example be arranged at the side of the tank or charging opening. In the closed position therefore, no foreign bodies—in particular snow—can enter the receiving space. The hinge arm may for example be mounted on the housing body via a mounting arranged inside the receiving space, and hence be pivoted between the closed position and the open position. A drive spring may be provided for moving the tank or charging flap into the open position and/or the closed position.

In the open position, at least part of the hinge arm protrudes from the receiving space. In contrast to the known tank or charging flap arrangements, this does not however expose the receiving space, i.e. open it to the environment. Instead, the receiving space is covered by the cover according to the invention. The term "cover" here means that the cover closes the receiving space such that no foreign bodies, such as snow for example, can penetrate into the receiving space from the environment. The cover may be arranged on the housing body and, in the open position of the tank or charging flap, cover the receiving space by resting on the hinge arm. The cover may also be arranged on the hinge arm and, in the open position of the tank or charging flap, cover the receiving space by resting on the housing body. The cover is here arranged directly or indirectly on the housing body or the hinge arm. In particular, the cover may also cover the receiving space in the closed position, and in some cases in any intermediate positions between the open position and the closed position, as will be explained below. The cover may for example comprise a cover flap which is mounted in pivotable fashion on the housing body or hinge arm, and which can cover the receiving space when resting against the hinge arm or housing body. The pivotable mounting may also be achieved via a cylindrical shaft component for example. However, also a "shaftless" pivot mounting is possible, in which for example bearing pegs are provided on opposite outer sides of the cover flap and are received in corresponding bearing receptacles of the housing body or hinge arm, for example so-called omega receptacles. In this embodiment, the bearing pegs are not connected together by a shaft component, and no shaft component is provided or necessary on the housing body or hinge arm. This "shaftless" design may avoid the need for sometimes complex shaft mounting. The cover, in particular the cover flap, may consist of a plastic, for example a hard plastic, in particular the same material as the hinge arm. The cover flap may also consist of a soft plastic, in particular a softer plastic than the hinge arm. It is for example also possible that the cover is a two-component part, made for example in a two-component injection molding process. The cover may for example comprise a base body made of a first plastic material and a sealing lip surrounding an outer edge of the base body and made from a second plastic material, wherein the second plastic material is softer than the first plastic material. The cover according to the invention thus guarantees a secure closure of the receiving space even when the tank or charging flap is in the open position.

According to one embodiment, on movement of the tank or charging flap between the closed position and the open position, the cover remains in contact with the hinge arm or the housing body. As already stated, the cover may be arranged on the housing body and may cover the receiving space when resting on the hinge arm, or be arranged on the hinge arm and cover the receiving space when resting on the housing body. In this embodiment, the cover remains in contact with the hinge arm or housing body in particular during the entire movement of the tank or charging flap between the closed position and open position. If for example the cover comprises a cover flap mounted in pivotable fashion on the housing body or hinge arm, this may be guided by the movement of the tank or charging flap and hence of the hinge arm. Thus, the cover flap may slide along the hinge arm or housing body. In this embodiment, the receiving space remains at least partially covered by the cover at all times. Thus, even in arbitrary intermediate positions of the tank or charging flap between the closed position and open position, no or at least almost no foreign bodies can enter the receiving space.

According to one embodiment, the cover is prestressed in contact with the hinge arm or the housing body. According to such an embodiment, this preload may be achieved by means of a spring. The cover, in particular a cover flap mounted in pivotable fashion on the housing body or hinge arm, can thus reliably cover the receiving space. In particular, such prestressing of the cover ensures in a simple fashion that the cover remains in contact with the hinge arm or housing body, as stated above, on movement of the tank or charging flap between the closed position and the open position. On movement of the tank or charging flap—and hence of the hinge arm—between the closed position and the open position, the hinge arm may work against the preload and the cover may thus slide along the hinge arm or along the housing body.

According to a further such embodiment, the spring may be formed by a drive spring for driving an opening and/or closing movement of the tank or charging flap. If the drive spring of the tank or charging flap is arranged on the inside of the housing, e.g. in a W-shaped design, one leg of the drive spring may also provide the preload of the cover. The other leg of the drive spring then performs the driving of the tank or charging flap. With this design, a spring and its mounting may be omitted.

According to one embodiment, the cover is configured such that it pivots towards the receiving space during a movement of the tank or charging flap from the closed position into the open position. This may be achieved in particular by corresponding preload of the cover against the hinge arm or against the housing body. In particular, a pivotably mounted cover flap may be prestressed, for example by a spring, in contact with the hinge arm or housing body such that the cover flap pivots into the receiving space on a movement of the tank or charging flap from the closed position to the open position. On movement of the tank or charging flap from the open position to the closed position, the cover may accordingly pivot away from the receiving space.

In an alternative embodiment, the cover is designed such that it pivots away from the receiving space during a movement of the tank or charging flap from the closed position into the open position. This can be achieved by a preload in the direction opposite that of the previous embodiment. On movement of the tank or charging flap from the open position to the closed position, in this embodiment the cover may accordingly pivot towards the receiving space. In particular, a pivotably mounted cover flap may be prestressed, e.g. by a spring, in contact with the hinge arm or housing body such that the cover flap pivots away from the receiving space on movement of the tank or charging flap from the closed position to the open position. For a cover which remains resting on the hinge arm or housing body, a protrusion may be provided on the hinge arm or housing body in order to prevent the cover from losing contact with the hinge arm or housing body on opening of the tank or charging flap and thus exposing the receiving space. This protrusion may limit the movement of the cover, in particular the movement of a pivotable cover flap.

According to one embodiment, the cover is guided on the hinge arm or the housing body via a slotted guide. The cover may be arranged pivotably on the housing body and be guided on the hinge arm via a slotted guide. The cover may also be arranged pivotably on the hinge arm and be guided on the housing body via a slotted guide. According to one such embodiment, the cover may have a guide protrusion which is guided in a guide groove of the hinge arm or of the housing body, or the hinge arm or the housing body may have a guide protrusion which is guided in a guide groove of the cover. The slotted guide may here be formed by the guide protrusion and the guide groove. Such a slotted guide also allows the cover to remain in contact with the hinge arm or housing body on movement of the tank or charging flap, and hence the hinge arm, between the closed position and the open position. In this case, no prestressing of the cover against the hinge arm or housing body is necessary. In particular, a preload spring may be omitted. The guide protrusion may in particular run along the guide groove with a degree of play, so as to allow reliable guidance even in the case of component tolerances. According to one such embodiment however, it may be provided that the guide groove is constricted at least at one end in such a manner that the guide protrusion is held in a play-free fashion when the tank or charging flap is in the open position. The term "end" here designates an end portion of the guide groove which the guide protrusion reaches in the open position or closed position of the tank or charging flap. In particular, the guide groove may be constricted in this way at both of its ends. Because of the constriction or tapering of the guide groove, the guide protrusion may be held without play in the end or ends of the guide; in particular, the guide protrusion may engage in the end portion of the guide groove. Thus in particular, the open position of the tank or charging flap may be securely maintained without any flapping of the tank or charging flap.

BRIEF DESCRIPTION OF THE DRAWINGS

Exemplary embodiments of the invention are explained below with reference to figures. The drawings show.

Unless specified otherwise, the same reference signs designate the same objects below.

DETAILED DESCRIPTION

Figure 1:
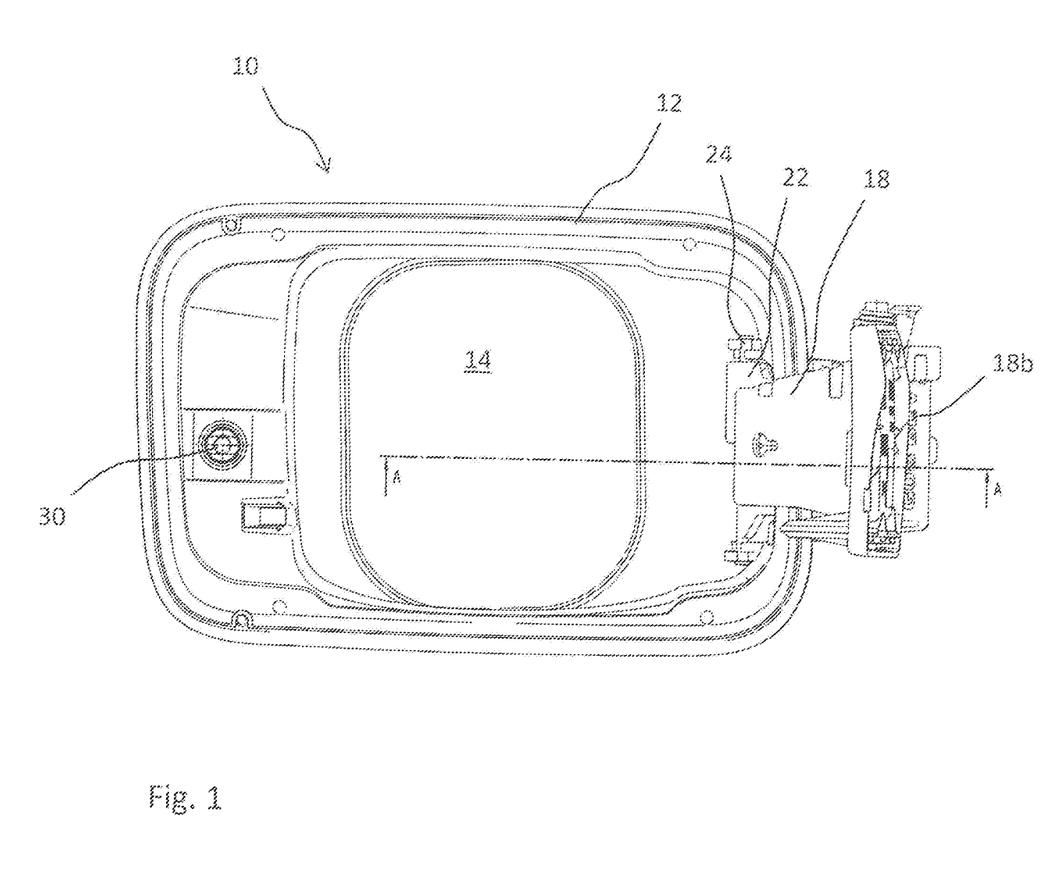
FIG. 1 is a top view of a tank or charging flap arrangement according to the invention, in a first exemplary embodiment.
Figures 2, 3:
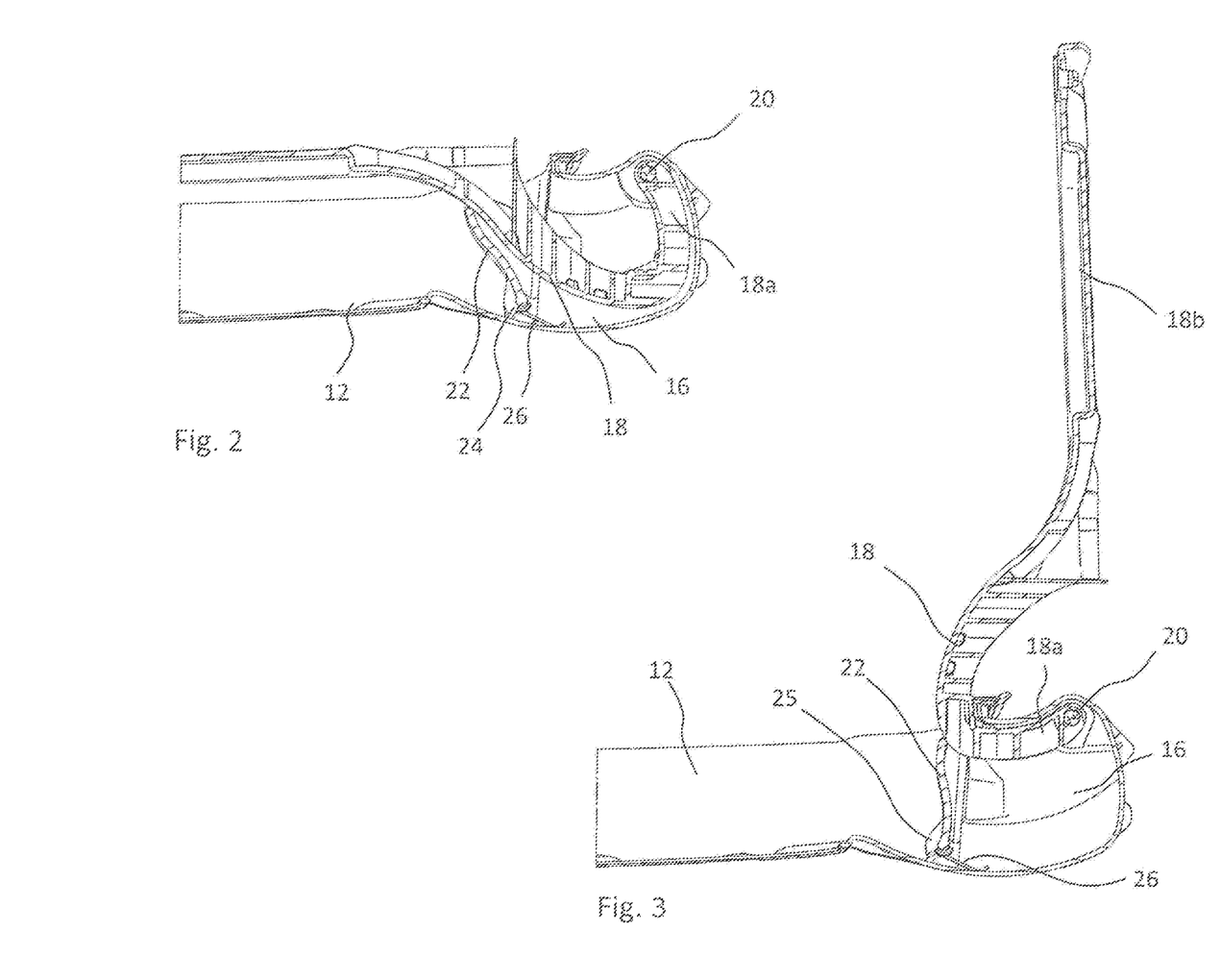
FIG. 2 is a partially depicted, sectional view of the tank or charging flap arrangement from FIG. 1, with the tank or charging flap in the closed position.
FIG. 3 is a partially depicted, sectional view of the tank or charging flap arrangement from FIG. 1, with the tank or charging flap in the open position.

FIGS. 1 to 3 show a first exemplary embodiment of a tank or charging flap arrangement 10 according to the invention. The tank or charging flap arrangement 10 comprises a housing body 12 with a tank or charging opening 14 and with a receiving space 16. The tank or charging flap arrangement 10 also comprises a hinge arm 18 which in the present example is formed as a swan neck. Via a first end 18a, the hinge arm 18 is mounted in pivotable fashion on the housing body 12 by means of a mounting 20 inside the receiving space 16. A second end 18b of the hinge arm 18 is designed for attachment of a tank or charging flap (not shown in figures). FIG. 1 also shows a pin receptacle 30 for receiving a pin (also not shown) of the tank or charging flap in the closed position. In this way, the tank or charging flap may be locked in the closed position.

According to the invention, the tank or charging flap arrangement 10 comprises a cover 22 which in the present case is formed as a cover flap mounted in pivotable fashion on the housing body. A mounting end of the cover 22 is mounted in pivotable fashion on the housing body 12 via a mounting 24, and is prestressed by means of the spring 26 with a contact end resting against the hinge arm 18.

In FIG. 2, the tank or charging flap and hence the hinge arm 18 is in the closed position. It is evident that the hinge arm 18 is received in the receiving space 16. In this closed position, the entire housing body 12 including the receiving space 16 is tightly closed against the environment by the tank or charging flap (not shown).

In the open position shown in FIG. 3, the hinge arm 18 is pivoted outward through around 90° and mostly protrudes out of the receiving space 16. The cover 22, which is prestressed in contact with the hinge arm 18, here covers the receiving space 16. Because of the spring preload of the cover resting against the hinge arm 18, the cover 22 remains in contact with the hinge arm 18 throughout the movement of the tank or charging flap—and hence of the hinge arm 18—between the closed position and the open position. As a comparison of FIGS. 2 and 3 shows, because of the spring preload, the cover 22 moves towards the receiving space 16 on movement of the tank or charging flap—and hence of the hinge arm 18—from the closed position to the open position. The receiving space 16 is closed by the cover 22, in particular in the open position of the tank or charging flap, such that no foreign bodies—in particular no snow—can penetrate into the receiving space. The tank or charging flap arrangement according to the invention may thus remain open for lengthy periods, for example when charging a battery overnight. At its mounting end, the cover 22 has a curvature 25 which receives the spring 26 and covers the mounting 24, such that no foreign bodies, such as for example snow, can enter the receiving space 16 in this way.

Figure 4:
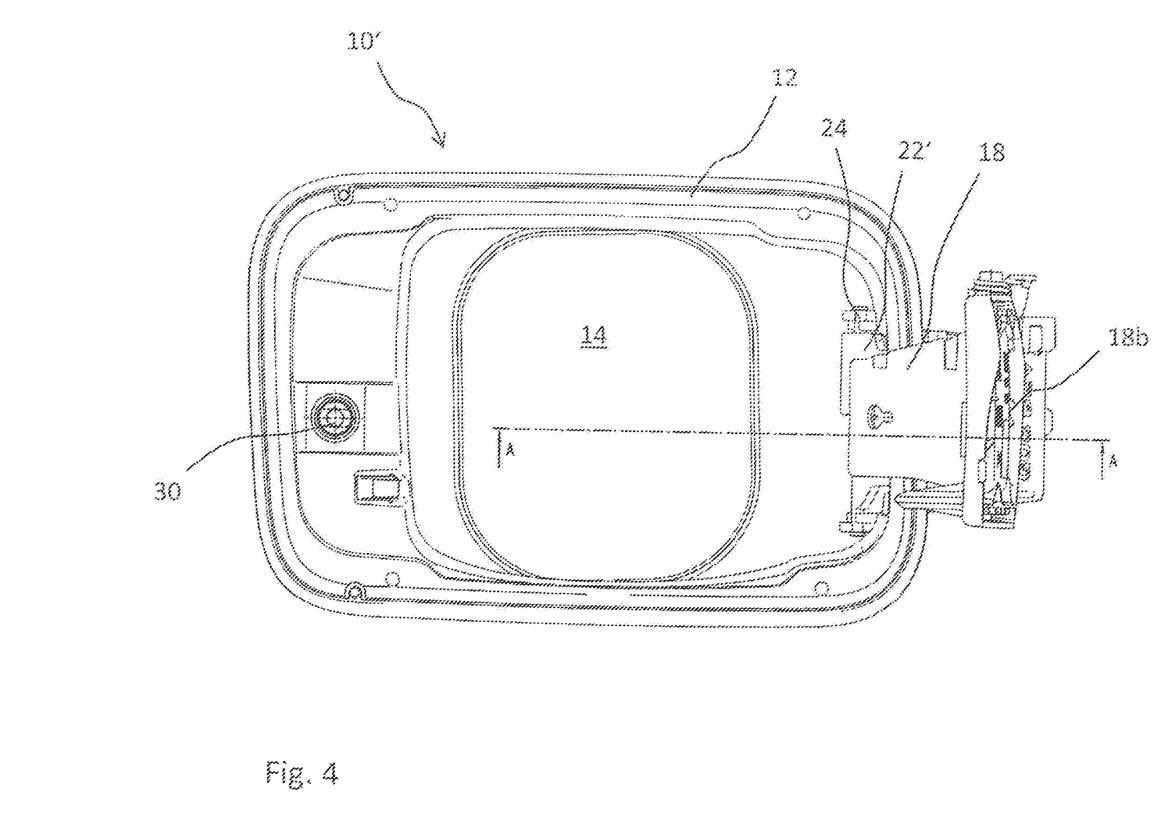
FIG. 4 is a tank or charging flap arrangement according to the invention in a further exemplary embodiment.
Figures 5, 6:
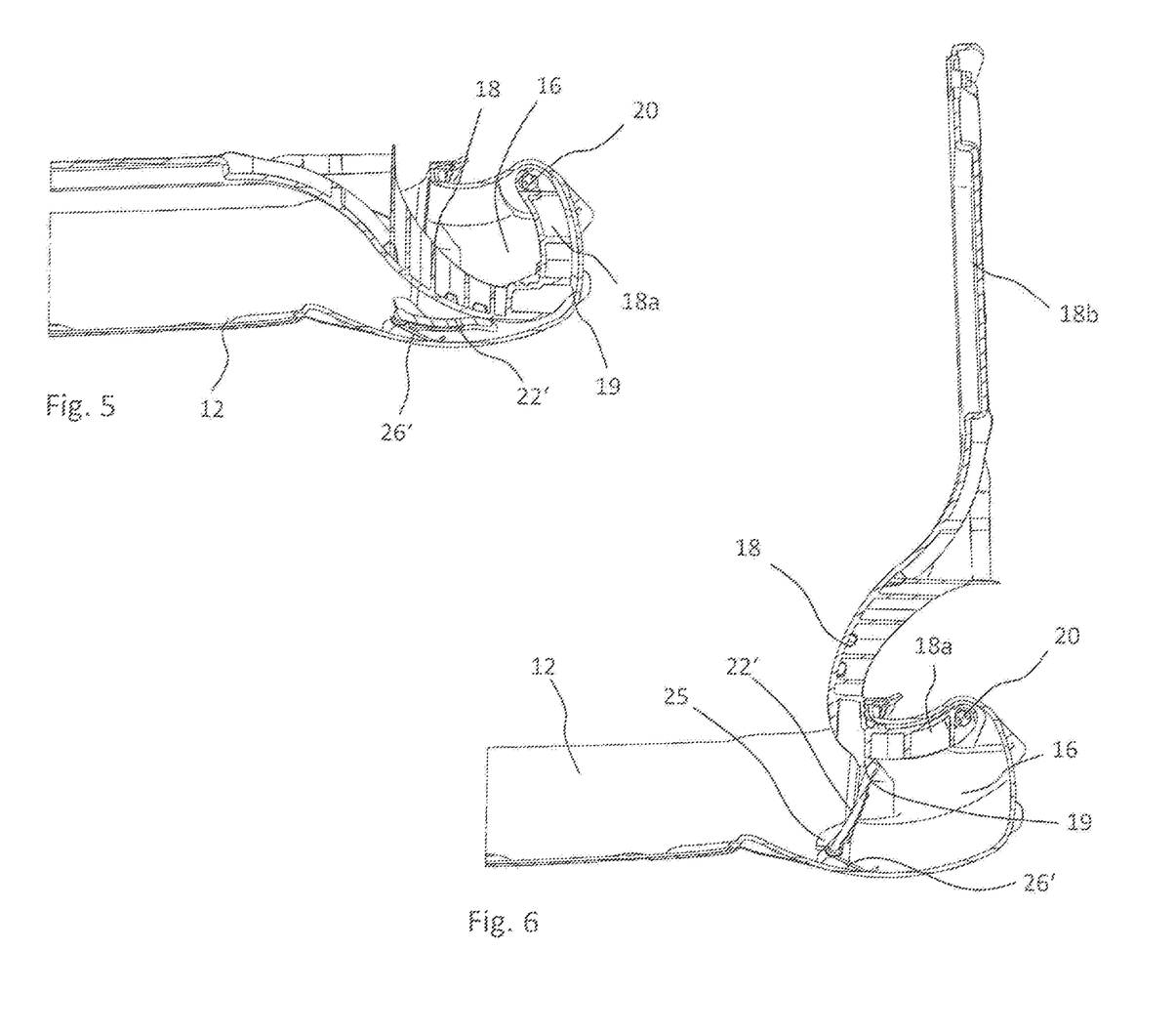
FIG. 5 is the tank or charging flap arrangement from FIG. 4 in a partially depicted, sectional view with the tank or charging flap in the closed position.
FIG. 6 is the tank or charging flap arrangement from FIG. 4 in a partially depicted, sectional view with the tank or charging flap in the open position.

FIGS. 4 to 6 show a second exemplary embodiment of a tank or charging flap arrangement 10' according to the invention. This embodiment differs from the first embodiment presented above in that the cover 22' is configured such that it moves away from the receiving space 16 on movement of the tank or charging flap—and hence of the hinge arm 18—from the closed position shown in FIG. 5 into the open position shown in FIG. 6. On movement of the tank or charging flap—and hence of the hinge arm 18—from the open position to the closed position, the cover is accordingly pivoted towards the receiving space 16, in particular into this.

A protrusion 19 may be formed on the hinge arm 18 which limits the outward pivot movement of the cover 22' away from the receiving space 16, as shown in FIG. 6. The contact end of the cover 22' here comes to rest on the protrusion 19. This pivot movement of the cover 22' is achieved by a corresponding preload of the spring 26'. The spring 26' prestresses the cover 22' against the hinge arm 18 such that a contact end of the cover 22' remains in contact with the hinge arm 18 throughout a movement of the tank or charging flap—and hence of the hinge arm 18—between the closed position and the open position. In contrast to the first embodiment however, the protrusion 19 must here be overcome.

Figure 7:
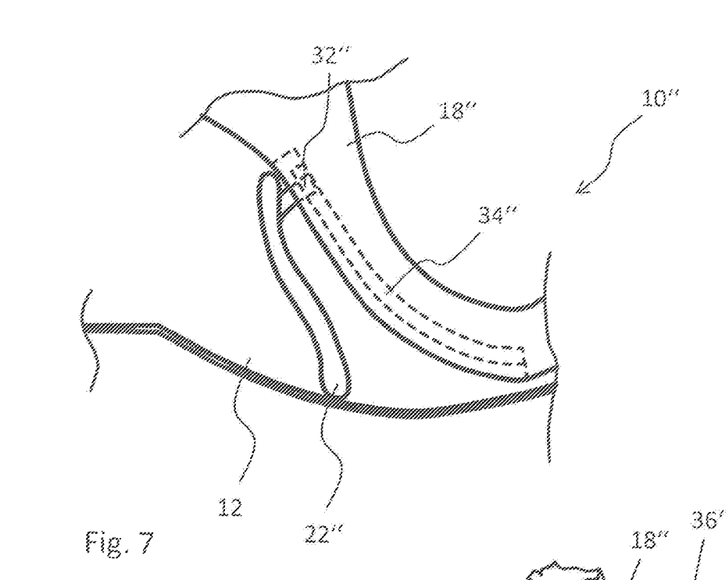
FIG. 7 is a partially depicted, sectional view of a tank or charging flap arrangement according to the invention in a further exemplary embodiment.
Figure 8:
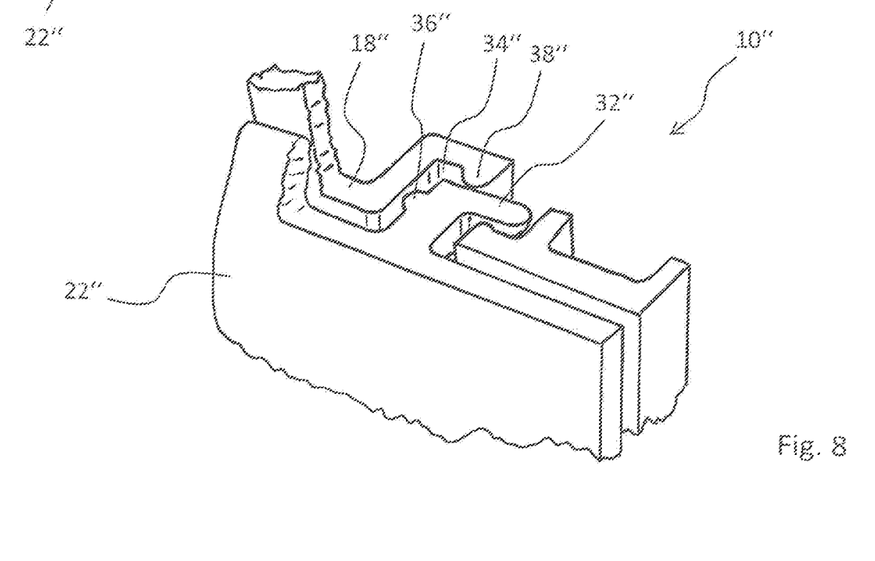
FIG. 8 is a further partial sectional view of the tank or charging flap arrangement shown in FIG. 7.

FIGS. 7 and 8 show an extract of a further exemplary embodiment of the tank or charging flap arrangement 10" according to the invention. The exemplary embodiment in FIGS. 7 and 8 differs from the exemplary embodiments described in FIGS. 1 to 6 with regard to the mounting of the cover 22". Otherwise, the exemplary embodiment in FIGS. 7 and 8 corresponds to the design according to the exemplary embodiments of FIGS. 1 to 3 or the exemplary embodiment of FIGS. 4 to 6.

In the exemplary embodiment according to FIGS. 7 and 8, the cover 22" is guided on the hinge arm 18" by a slotted guide. For this, the cover 22" has a guide protrusion 32" which is guided in a guide groove 34" of the hinge arm 18". In FIG. 7, the guide groove 34" with the guide protrusion 32" arranged therein is drawn in dotted lines for illustration. In order to avoid an extensive superficial contact between the guide protrusion 32" and the guide groove 34", the guide protrusion 32" and the guide groove 34" each have at least one contact bulge 36". The guide groove 34" may taper at least at one of its ends, for example at both ends, so that the guide protrusion 32" is held in play-free fashion in the open position and/or closed position of the tank or charging flap. Between these end positions, the guide protrusion 32" may however run in the guide groove 34" with relatively great play in order to avoid seizing or similar. As in the exemplary embodiments explained above, the cover 22" may be mounted on the housing body 12 by its end facing away from the end guided in the guide groove 34".

Figure 9:
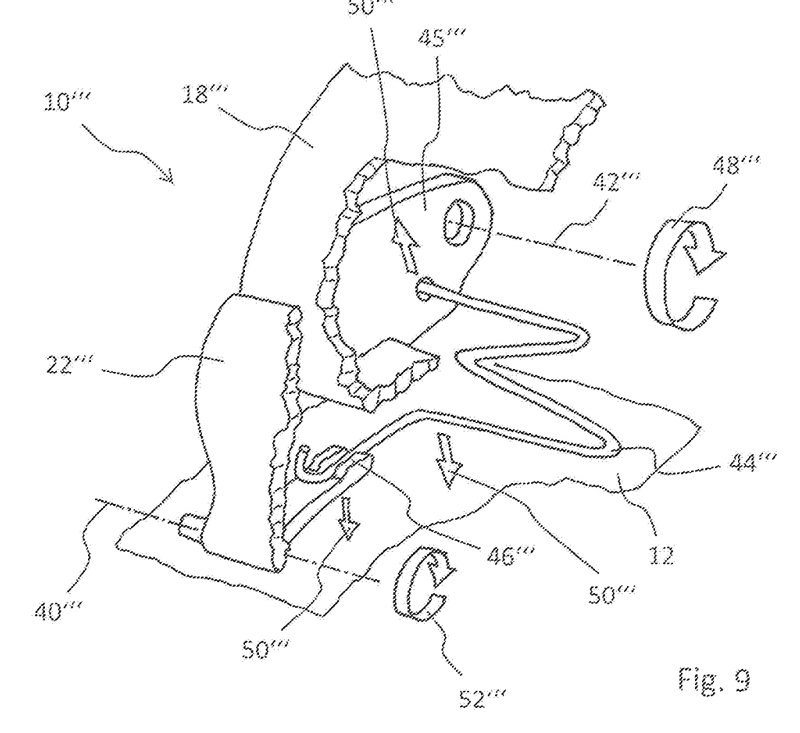
FIG. 9 is a partially depicted, sectional view of a tank or charging flap arrangement according to the invention in a further exemplary embodiment.

FIG. 9 shows a partial sectional, perspective view of a further exemplary embodiment of a tank or charging flap arrangement 10''' according to the invention. The cover 22''' is here again mounted on the housing body 12 so as to be pivotable about a pivot axis marked in FIG. 9 with reference sign 40'''. Reference sign 18''' designates the hinge arm which, in the example shown, is mounted on the housing body 12 via a mounting component 45''' so as to be pivotable about a pivot axis 42'''.

The exemplary embodiment shown in FIG. 9 differs from the exemplary embodiments described in FIGS. 1 to 8 in particular with regard to the spring preload of the cover 22'''. Otherwise, the exemplary embodiment in FIG. 9 corresponds to the exemplary embodiments shown in FIGS. 1 to 3, FIGS. 4 to 6, or FIGS. 7 and 8. In the exemplary embodiment according to FIG. 9, a W-shaped drive spring 44''' is provided, one leg of which is mounted on the mounting component 45''' and the other leg of which is mounted in a spring mounting 46''' of the cover 22'''. When the hinge arm 18''' is pivoted clockwise, as indicated in FIG. 9 by the arrow 48''', the drive spring 44''' deforms as illustrated by arrows 50''' in FIG. 9. This leads to a preload of the cover 22''' as illustrated in FIG. 9 with arrow 52'''. With the exemplary embodiment in FIG. 9, is advantageously possible to also prestress the cover 22''' against the hinge arm 18''' by the drive spring 44''' which preloads the hinge arm 18''' and hence the tank or charging flap in the open position and/or the closed position.

LIST OF REFERENCE SIGNS

- 10 Tank or charging flap arrangement
- 10' Tank or charging flap arrangement
- 10" Tank or charging flap arrangement
- 10''' Tank or charging flap arrangement
- 12 Housing body
- 14 Tank or charging opening
- 16 Receiving space
- 18 Hinge arm
- 18" Hinge arm
- 18''' Hinge arm
- 18a First end of hinge arm
- 18b Second end of hinge arm
- 19 Protrusion
- 20 Mounting
- 22 Cover
- 22' Cover
- 22" Cover
- 22''' Cover
- 24 Mounting
- 25 Curvature
- 26 Spring
- 26' Spring
- 30 Pin receiver
- 32" Guide protrusion
- 34" Guide groove
- 36" Contact bulge
- 40''' Pivot axis
- 42''' Longitudinal axis
- 44''' Drive spring
- 45''' Bearing component
- 46''' Spring mounting
- 48''' Arrow
- 50''' Arrow
- 52''' Arrow

What is claimed is:

1. Tank flap or charging flap arrangement for a vehicle, comprising a housing body and a tank flap or charging flap which is mounted on the housing body via a hinge arm so as to be pivotable between a closed position and an open position, wherein, in the closed position, the hinge arm is received in a receiving space of the housing body and, in the open position, at least partially projects out of the receiving space, wherein a covering is arranged on the housing body or on the hinge arm and covers the receiving space in the open position of the tank flap or charging flap.

2. Tank flap or charging flap arrangement according to claim 1, characterized in that, during the movement of the tank flap or charging flap between the closed position and the open position, the covering remains in contact against the hinge arm or against the housing body.

3. Tank flap or charging flap arrangement according to claim 1, characterized in that the covering is prestressed in contact against the hinge arm or against the housing body.

4. Tank flap or charging flap arrangement according to claim 3, characterized in that the covering is prestressed by means of a spring.

5. Tank flap or charging flap arrangement according to claim 4, characterized in that the spring is formed by a drive spring for driving an opening and/or closing movement of the tank flap or charging flap.

6. Tank flap or charging flap arrangement according to claim 1, characterized in that the covering is designed in such a manner that it pivots towards the receiving space during a movement of the tank flap or charging flap from the closed position into the open position.

7. Tank flap or charging flap arrangement according to claim 1, characterized in that the covering is designed in such a manner that it pivots away from the receiving space during a movement of the tank flap or charging flap from the closed position into the open position.

8. Tank flap or charging flap arrangement according to claim 1, characterized in that the covering is guided via a slotted guide on the hinge arm or the housing body.

9. Tank flap or charging flap arrangement according to claim 8, characterized in that the covering has a guide projection which is guided in a guide groove of the hinge arm or of the housing body, or in that the hinge arm or the housing body has a guide projection which is guided in a guide groove of the covering.

10. Tank flap or charging flap arrangement according to claim 9, characterized in that the guide groove is constricted at least at its one end in such a manner that the guide projection is held in a play-free manner in the open position of the tank flap or charging flap.

11. A tank flap or charging flap arrangement for a vehicle, comprising:
   a housing body including a receiving space;
   a tank flap or charging flap mounted on the housing body via a hinge arm so as to be pivotable between a closed position and an open position, wherein, in the closed position, the hinge arm is received in the receiving space and, in the open position, the hinge arm at least partially projects out of the receiving space;
   a covering arranged on the housing body or on the hinge arm, wherein the covering covers the receiving space when the tank flap or charging flap is in the open position.

12. The tank flap or charging flap arrangement according to claim 11, wherein, during movement of the tank flap or charging flap between the closed position and the open position, the covering remains in contact against the hinge arm or against the housing body.

13. The tank flap or charging flap arrangement according to claim 11, wherein the covering is prestressed in contact against the hinge arm or against the housing body.

14. The tank flap or charging flap arrangement according to claim 13, wherein the covering is prestressed by means of a spring.

15. The tank flap or charging flap arrangement according to claim 14, wherein the spring is formed by a drive spring for driving an opening and/or a closing movement of the tank flap or charging flap.

16. The tank flap or charging flap arrangement of claim 11, wherein a mounting of the hinge arm to the housing body is located in the receiving space.

\* \* \* \* \*